United States Patent
Ukita

(10) Patent No.: US 6,804,603 B2
(45) Date of Patent: Oct. 12, 2004

(54) NAVIGATION DEVICE AND NAVIGATION METHOD

(75) Inventor: Tomohiko Ukita, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/887,346

(22) Filed: Jun. 25, 2001

(65) Prior Publication Data

US 2001/0044694 A1 Nov. 22, 2001

Related U.S. Application Data

(63) Continuation of application No. PCT/JP99/06344, filed on Nov. 12, 1999.

(51) Int. Cl.$^7$ .............................................. G01C 21/26
(52) U.S. Cl. ...................... 701/200; 701/208; 701/211; 73/178 R
(58) Field of Search ................................ 701/200, 208, 701/211

(56) References Cited

U.S. PATENT DOCUMENTS

| | | | | |
|---|---|---|---|---|
| 5,351,059 A | * | 9/1994 | Tsuyuki | 342/457 |
| 5,557,522 A | * | 9/1996 | Nakayama et al. | 701/200 |
| 5,908,464 A | * | 6/1999 | Kishigami et al. | 701/208 |
| 6,118,389 A | * | 9/2000 | Kamada et al. | 340/995.21 |
| 6,185,503 B1 | * | 2/2001 | Sumizawa | 701/209 |
| 6,205,396 B1 | * | 3/2001 | Teicher et al. | 701/200 |
| 6,278,928 B1 | * | 8/2001 | Aruga et al. | 701/65 |
| 6,324,462 B1 | * | 11/2001 | Kageyama | 701/93 |
| 6,389,358 B2 | * | 5/2002 | Uchigaki | 701/209 |
| 6,421,604 B1 | * | 7/2002 | Koyanagi et al. | 701/208 |
| 6,424,911 B2 | * | 7/2002 | Yamashita et al. | 701/208 |
| 6,466,869 B2 | * | 10/2002 | Yamashita et al. | 701/211 |
| 6,480,786 B2 | * | 11/2002 | Watanabe et al. | 701/211 |
| 6,484,078 B1 | * | 11/2002 | Kageyama | 701/25 |
| 6,505,120 B2 | * | 1/2003 | Yamashita et al. | 701/211 |

FOREIGN PATENT DOCUMENTS

| | | |
|---|---|---|
| EP | 0636863 | 7/1994 |
| JP | 4-299378 | 10/1992 |
| JP | 6-68386 | 3/1994 |
| JP | 7-44796 | 2/1995 |
| JP | 8-304098 | 11/1996 |
| JP | 9-133541 | 5/1997 |
| JP | 10-318776 | 12/1998 |

* cited by examiner

Primary Examiner—Thomas G. Black
Assistant Examiner—Olga Hernandez
(74) Attorney, Agent, or Firm—Birch, Stewart, Kolasch & Birch, LLP

(57) ABSTRACT

A route from a present position of a vehicle to a destination is displayed, the names of intersections existing on the route and the distance to the intersections are also displayed.

20 Claims, 6 Drawing Sheets

INTERSECTION NAME LIST

| NODE NUMBER | INTERSECTION NAME |
|---|---|
| NODE 1 | SHIYAKUSHOMAE |
| NODE 2 | AKASAKA |
| NODE 3 | NO NAME |
| NODE 4 | NO NAME |
| NODE 5 | SHIMAGAYA |
| NODE 6 | NAGAO |

NAVIGATION DEVICE AND NAVIGATION METHOD

CROSS-REFERENCE TO THE RELATED APPLICATION

This application is a Continuation of PCT International Application No. PCT/JP99/06344 filed on Nov. 12, 1999, which was published in English and which designated the United States, and on which priority is claimed under 35 U.S.C. § 120, the entire contents of which are hereby incorporated by reference.

BACKGROUND OF THE INVENTION

1. Field of the Invention

The present invention relates to a navigation device and a navigation method, which display a route from a present position of a vehicle to a destination and guide the vehicle to the destination.

2. Description of the Related Art

A navigation device is provided with a display screen which is opened as required by a driver or is opened automatically when guiding a route or the device may be provided with a display screen which is used when setting a route.

In particular, JP-A-9-133541 discloses a technique by which intersections at which the vehicle turns to the left or the right (hereafter turning points) on a guided route are detected and a plurality of such turning point intersection names are displayed on a display screen.

Furthermore, JP-A-6-68386 discloses a technique by which when a vehicle is travelling on a route, a subsequent intersection through which the vehicle will pass is detected and a name of the intersection is displayed on a display screen.

Since the conventional navigation device is constructed as above, the problem has arisen that although the name of intersection through which the vehicle will subsequently pass is displayed on a display screen, even if a user recognizes the name of a subsequent intersection, it is not possible to determine how many intersections ahead the turning point intersection is located and thus it is not possible to easily understand the route.

SUMMARY OF THE INVENTION

The present invention is proposed to solve the above problems and has the object of providing a navigation device and a navigation method which can clearly display turning point intersections and thus facilitate the route recognition.

A navigation device of the present invention is adapted to display the name of intersections extracted by a route guiding means and the distance to the intersections while displaying a route searched by a route searching means.

In such a way, route recognition is facilitated and it is possible to take precautions to prevent divergence from the route.

The navigation device of the present invention may be adapted to confirm passage of the intersection by the vehicle and to give a change command with respect to the intersection to be displayed to the display means.

In such a way, it is possible to ensure recognition of only the forward turning point intersections from the present position.

The navigation device of the present invention may be adapted to display a direction of travel at an intersection when the intersection extracted from the route guiding means is a turning point intersection.

In such a way, immediate recognition is enabled of at which forward intersection turning should be performed from the present position and thus the direction of travel can be varied at ease.

The navigation device of the present invention may be adapted to display an intersection with emphasis when the intersection extracted by the route guiding means is a turning point intersection.

In such a way, immediate recognition is enabled of at which forward intersection turning should be performed from the present position and thus the direction of travel can be varied at ease.

The navigation device of the present invention may be adapted to display a fact of a non-recordal of an intersection name when the name of the intersection extracted by the route guiding means is not recorded on a map information.

In such a way, it is possible to prevent missing a small intersection the name of which is not recorded.

The navigation device of the present invention may be adapted to generate a temporary name of an intersection from information linked to the intersection and to display the temporary name, when the name of the intersection extracted by the route guiding means is not recorded on a map information.

In such a way, it is possible to prevent missing a small intersection the name of which is not recorded.

The navigation device of the present invention may be adapted to display a landmark or a traffic signal mark together with the name of an intersection when information relating to the landmark or the traffic signal mark which is related to the intersection extracted by the route guiding means is recorded on a map information.

In such a way, it is possible to facilitate intersection discrimination.

The navigation device of the present invention may be adapted to display intersections at points of traffic congestion with emphasis when traffic congestion information with respect to the route searched by the route searching means is received.

In such a way, it is possible to recognize traffic congestion on a scheduled route.

A navigation method of the present invention is adapted to display the name of each of intersections existing on a route from a present point of a vehicle to a destination and the distance to each of the intersections, while displaying the route.

In such a way, route recognition is facilitated and it is possible to take precautions to prevent divergence from the route.

The navigation method of the present invention may be adapted to change an intersection to be displayed upon the confirmation of the vehicle passing through the intersection.

In such a way, it is possible to ensure recognition of only intersections which exist on the route forward of the present position.

The navigation method of the present invention may be adapted to display a direction of travel at an intersection when the intersection existing on the route is a turning point intersection.

In such a way, immediate recognition is enabled of at which forward intersection turning should be performed from the present position and thus the direction of travel can be changed with ease.

The navigation method of the present invention may be adapted to display an intersection with emphasis when the intersection existing on the route is a turning point intersection.

In such a way, immediate recognition is enabled of at which forward intersection turning should be performed from the present position and thus the direction of travel can be changed with ease.

The navigation method of the present invention may be adapted to display a fact of a non-recordal of an intersection name when the name of the intersection existing on the route is not recorded on a map information.

In such a way, it is possible to prevent missing a small intersection the name of which is not recorded.

The navigation method of the present invention may be adapted to generate a temporary name of an intersection from information related to the intersection and to display that temporary name, when the name of the intersection existing on the route is not recorded on a map information.

In such a way, it is possible to prevent missing a small intersection the name of which is not recorded.

The navigation method of the present invention may be adapted to display a landmark or a traffic signal mark together with the name of an intersection when information relating to the landmark or the traffic signal mark which is related to the intersection existing on the route is recorded on a map information.

In such a way, it is possible to facilitate intersection discrimination.

The navigation method of the present invention may be adapted to display intersections at points of congestion with emphasis when traffic congestion information with respect to the searched route is received.

In such a way, it is possible to recognize traffic congestion on a scheduled route.

DETAILED DESCRIPTION OF THE PREFERRED EMBODIMENTS

In order to describe the invention in greater detail, the preferred embodiments of the present invention will be described below with reference to the accompanying figures.
Embodiment 1

Figure 1:
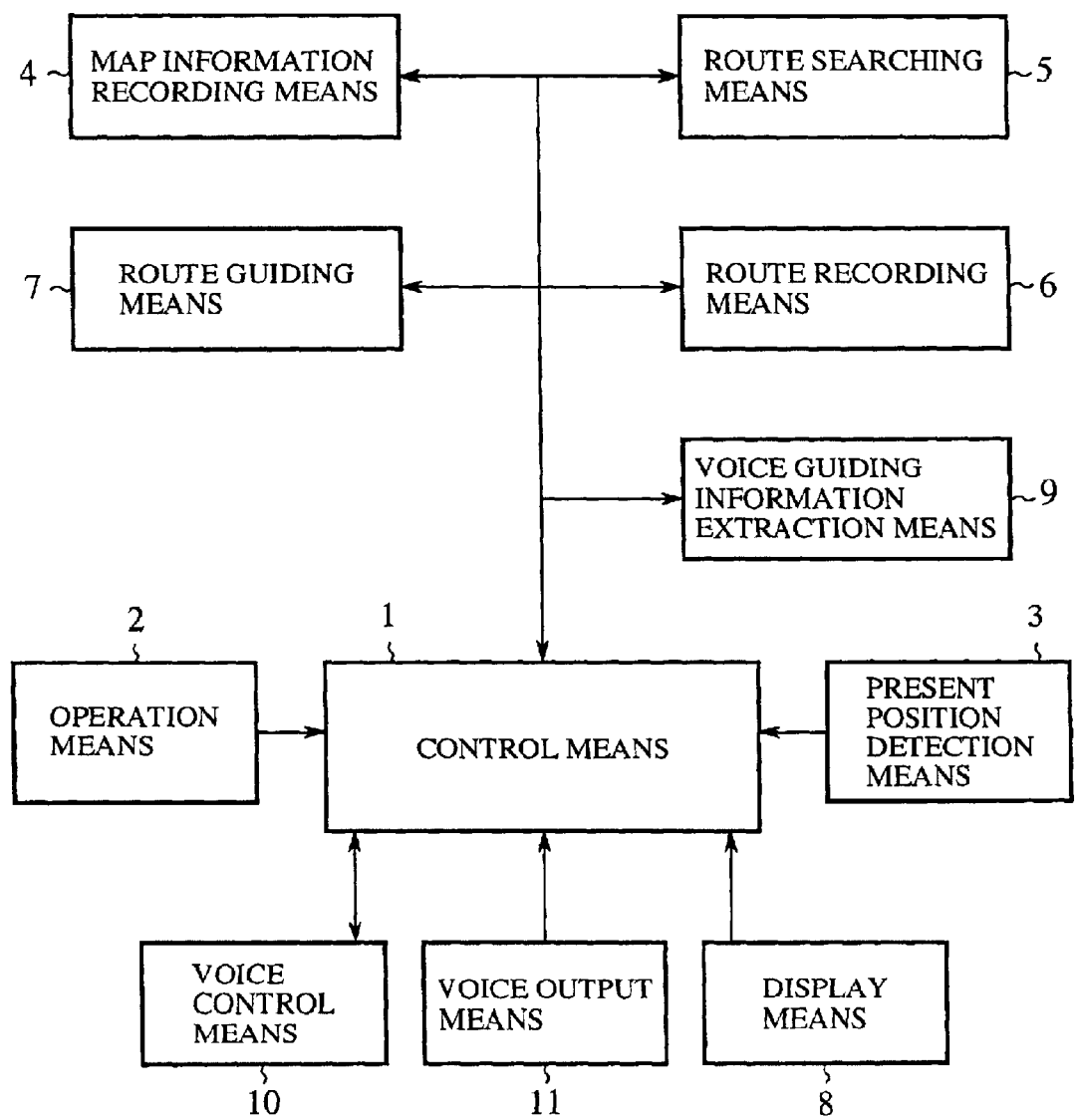
FIG. 1 shows a navigation device according to a first embodiment of the present invention.

FIG. 1 shows a navigation device according to a first embodiment of the present invention. In the figures, reference numeral 1 denotes a control means which executes each type of calculation and which performs control of other constituting elements in the navigation device.

2 is an operation means by which a user inputs the destination and the like of a vehicle. 3 is a present position detection means which detects a present position of the vehicle, 4 is a map information recording means for recording digitized map information data such as link data and node data showing intersections, roads and the like. 5 is a route searching means which searches a route between the two geographic points, from a present position to a destination, referring to the map information data recorded in the map information recording means 4. 6 is a route recording means which records the route determined by the route searching means 5.

7 is a route guiding means which extracts intersections existing on the route searched by the route searching means 5, specifies turning point intersections and the like and calculates the distance from the present position of a vehicle to each intersection. The route guiding means 7 performs determination of intersections to be passed and intersections at which turning is performed from road categories and the connecting angles of adjacent links. Furthermore, the route guiding means 7 decides the timing of changing information with respect to the intersections passed and effects read-out operation of the intersection information from the map information recording means 4.

8 is a display means which displays a route recorded on the route recording means 6 and which displays the name of each intersection extracted by the route guiding means 7, the distance to each intersection and the like. 9 is a voice guiding information extraction means which extracts main guiding information from guiding information related to the route recorded in the route recording means 6.

10 is a voice control means which converts voice data to analog signals and generates a voice guiding message, when a guiding command is received from the control means 1. 11 is a voice output means which outputs a voice signal corresponding to the voice guiding message generated by the voice control means 10 and which informs a user of the guiding message.

Figure 2:
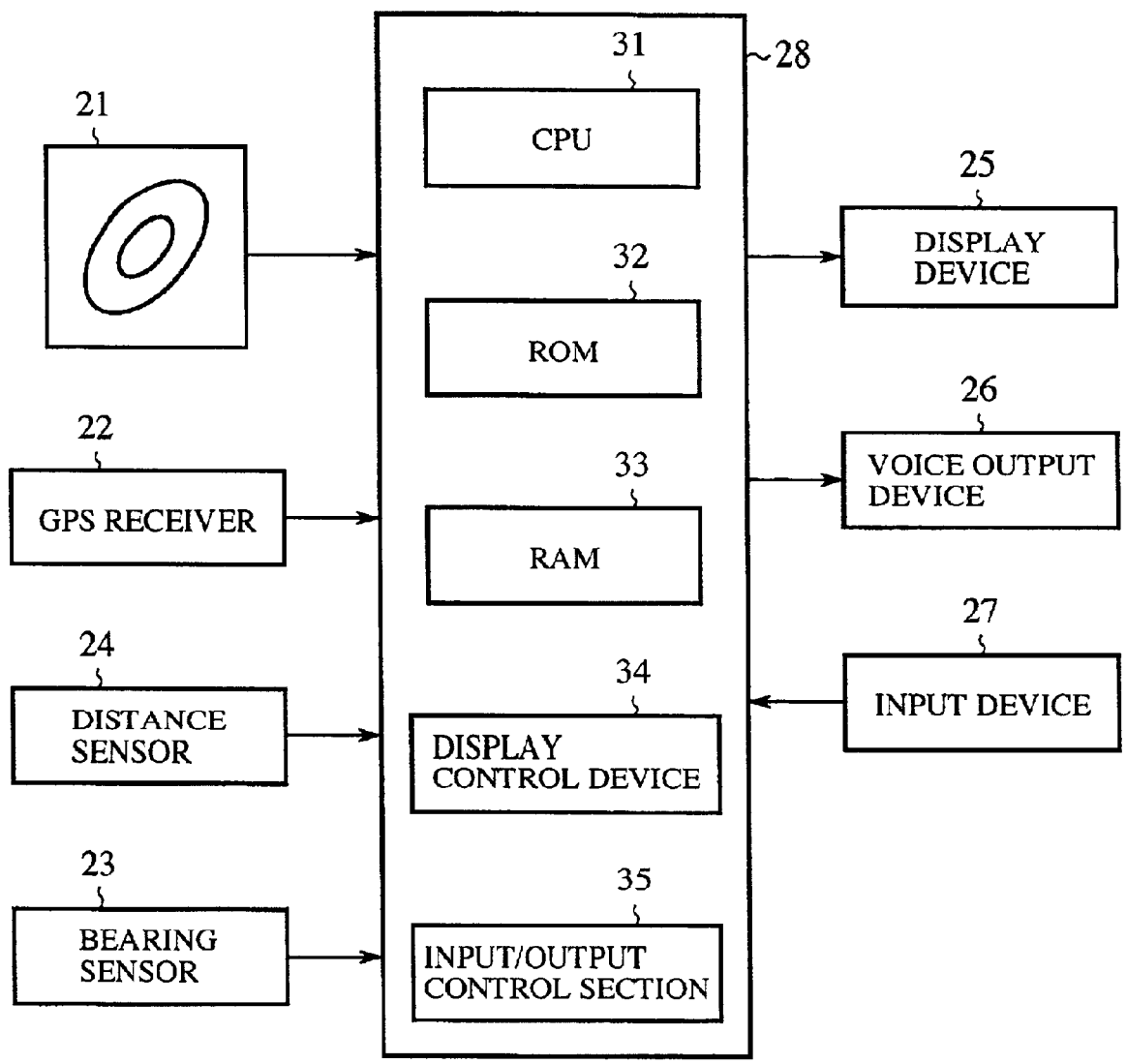
FIG. 2 is a block diagram showing the structure of hardware of the navigation device as shown in FIG. 1.

FIG. 2 is a block diagram showing the structure of hardware of the navigation device as shown in FIG. 1. In the figures, reference numeral 21 denotes a reading device, which is provided with a compact disk read-only memory (CD-ROM) in which digitized map information data is stored. The reading device 21 corresponds to the map information recording means 4 in FIG. 1.

22 is a GPS receiver which receives radio waves from an artificial satellite using a global positioning system (GPS) and detects a present position of the vehicle. 23 is a bearing sensor which detects a bearing in which the vehicle is traveling. 24 is a distance sensor which detects the traveled distance of the vehicle.

The present position detection means as shown in FIG. 1 is comprised of the GPS receiver 22, the bearing sensor 23 and the distance sensor 24.

25 is a display device which has for example a liquid crystal display and which displays a determined route and the like as well as a map and map information on the basis of the map information data. The display device 25 corresponds to the display means 8 in FIG. 1.

26 is a voice output device which outputs a voice guiding message and which corresponds to the voice output means 11 in FIG. 1.

27 is an input device which has a switch which is operated when a command is input to the navigation device by a user and which supplies the user command to the control unit 28. The input device 27 corresponds to the operation means 2 in FIG. 1.

28 is a control unit which is comprised of a central processing unit (CPU) 31, a read-only memory (ROM) 32, a random access memory (RAM) 33, a display control section 34 and an input/output control section 35. The control unit 28 executes each type of calculation in the navigation device and performs control of other constituting elements. The control unit 28 corresponds to the control means 1, the route searching means 5, the route recording means 6, the route guiding means 7, the voice guiding information extraction means 9 and the voice control means 10 in FIG. 1.

31 is a CPU which executes processing such as route searching and guiding point extraction, 32 is a ROM which pre-stores programs and data which are used in the CPU 31. 33 is a RAM, to which the program and data used in the CPU 31 are loaded, and which stores calculation results due to the CPU 31. 34 is a display control section which controls the display device 25 and displays each type of image on the display device 25. 35 is an input/output control section which acts as an interface between the control unit 28 and each external device (read-out device 21—input device 27) and which performs transfer of signals and each type of data.

Figure 3:
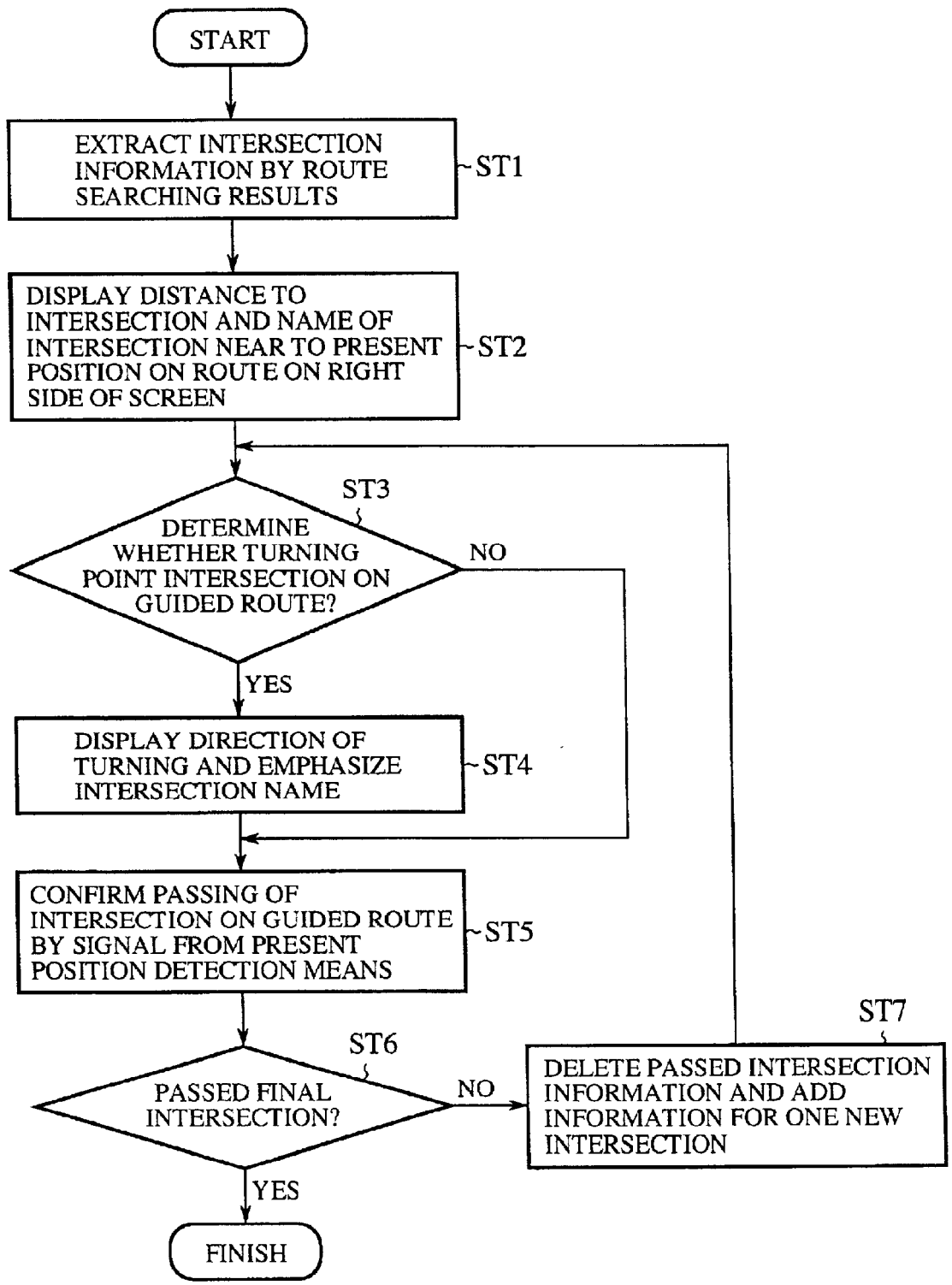
FIG. 3 is a flowchart of a navigation method according to the first embodiment of the present invention.

FIG. 3 is a flowchart of a navigation method according to the first embodiment of the present invention.

The operation of the navigation device according to the present invention will be described below.

Firstly, when a destination is input from the operation means 2 by a user, under control of the control means 1 the route searching means 5 refers to the map information data stored in the map information recording means 4 and searches a route between the two geographic points from a present position detected by the present position detection means 3 to a destination for example by use of a Dijkstra method or the like. Thus, a single route is determined as the route of the vehicle (for example, shortest route).

The route for the vehicle, which is the search result of the route searching means 5, is stored in the route recording means 6. Under control of the control unit 1, the route guiding means 7 refers to map information data recorded in the map information recording means 4 and extracts intersections (nodes) existing on the route of the vehicle in sequence from those in proximity to the present position.

Figures 6, 7:
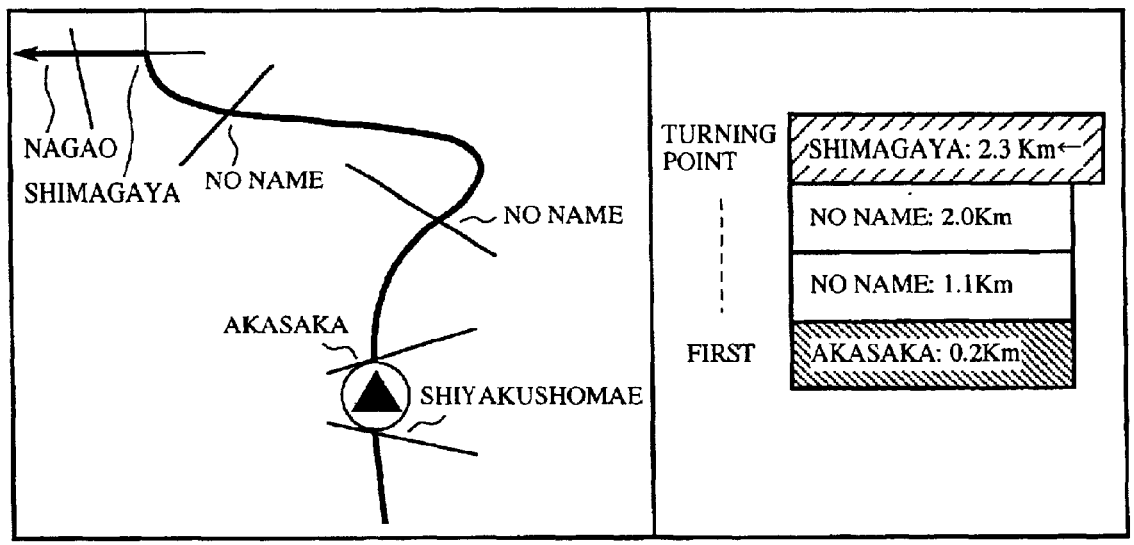
FIG. 6 describes the display contents of a screen.
FIG. 7 describes an intersection name list.

The route guiding means 7, as shown in FIG. 7, extracts node numbers indicative of the intersections and the intersection names from the map information data and stores such information in an intersection name list (step ST1).

The intersection names are extracted from additional information with respect to the nodes, which is recorded in the map information data. On the other hand, when the intersection names are not added as the additional information with respect to the nodes, the term "no name" is stored in the intersection name list.

Subsequently, the route guiding means 7 refers to the map information data and calculates distances to five forward intersections from the present position (five intersections existing on the route which are proximate to the present position).

Figure 4:
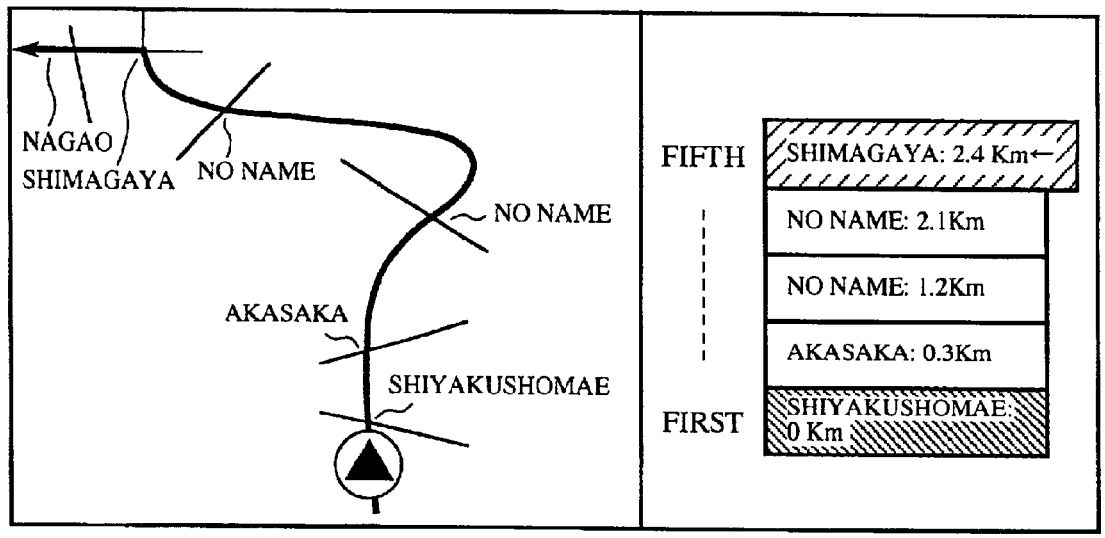
FIG. 4 describes the display contents of a screen.

After the calculation of the distances from the present position to the five forward intersections by the route guiding means 7, the display means 8 displays, under control of the control means 1, a route stored in the route recording means 6 on the map, which is displayed on the left side of the screen, as shown in FIG. 4. The names of the five forward intersections and the distance to each intersection are displayed on the right side of the screen (step ST2). However, when the intersection names are not stored in the intersection name list, either the term "no name" is displayed or the name column is left blank and only the distance is displayed.

When the name of intersections or the like are displayed on the right side of the screen, the display means 8 emphasizes display of turning point intersections by displaying intersections recognized as the turning point intersections by the route guiding means 7 in a different color to that of other intersections (hereafter termed transit intersections). The direction of travel in the turning point intersections is displayed by an arrow (step ST3, ST4).

In the example shown in FIG. 4, an intersection "Shimagaya" which is the fifth intersection from the present position is recognized as a turning point intersection and displayed with emphasis. It is noted that in the example shown in FIG. 4, the first intersection "Shiyakushomae" from the present position is also displayed with emphasis.

In such a way, names and distances from a present position to five forward intersections are displayed, and further, turning point intersections and an immediately subsequent intersection are displayed with emphasis. Therefore, a user can perceive the vehicle route.

Figure 5:
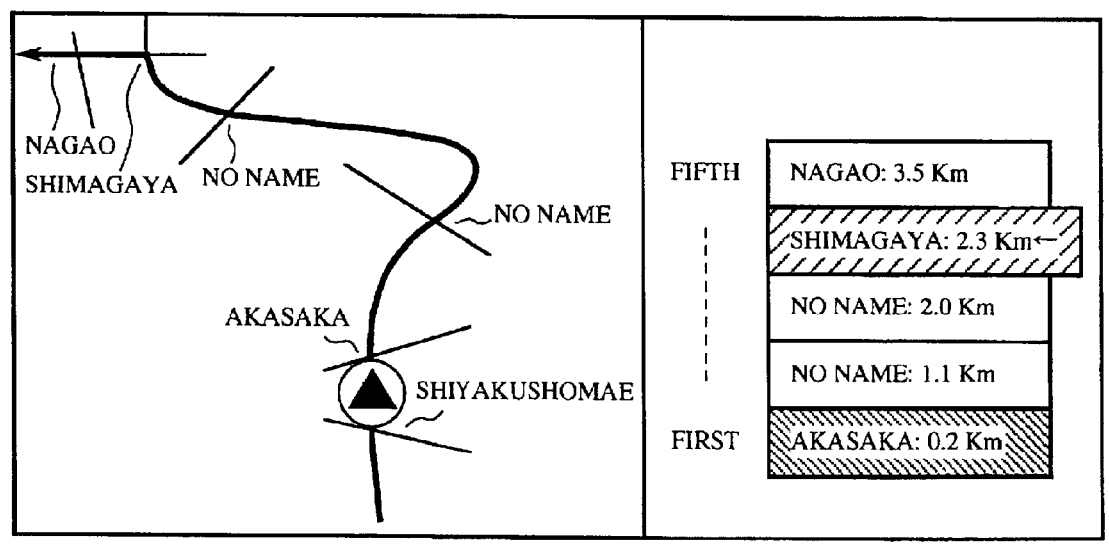
FIG. 5 describes the display contents of a screen.

Next, when the transit of the first intersection from the present position detected by the present position detection means 3 is recognized by the route guiding means 7 (step ST5), the display means as shown in FIG. 5 deletes information with respect to the transit intersection passed by the vehicle and adds information with respect to a new intersection (step ST6, ST7).

In other words, when the vehicle passes through the intersection of "Shiyakushomae" and an intersection "Akasaka" becomes the next intersection, intersection information (name and distance) with respect to the intersection "Shiyakushomae" is deleted, intersection information with respect to intersections from the intersection "Akasaka" to the intersection "Shimagaya" are respectively scrolled downwards, and intersection information with respect to an intersection "Nagao" which becomes the new fifth intersection is displayed on the uppermost position.

However, in the step ST6, if a transit intersection passed by the vehicle is determined to be the last intersection on the route, a series of operations is completed.

As described above, according to the first embodiment, the navigation device is adapted to display a route from a present position of a vehicle to a destination and to display a distance to each intersection and the name of each intersection located on the route. Thus, it is possible to sensuously understand the direction of travel at an intersection, and as a result, to take precautions to prevent divergence from the route.

Turning point intersections may be displayed with emphasis from among the intersections displayed on a map located on the left side of the screen. However, when the intersection information is not displayed on the right side of the screen, it is not possible to sensuously understand at which intersection turning is to be performed or the distance to the turning point intersection. Thus, even when the turning point intersections are displayed with emphasis on a map located on the left side of the screen, it is necessary to display the intersection information on the right side of the screen.

Embodiment 2

In the first embodiment, after passing through an intersection, information relating to the transit (passed) intersection is deleted and information relating to a new intersection is added to the display. However, as shown in FIG. 6, the amount of displayed intersection information may be successively reduced by not adding new intersection information until a turning point intersection is passed.

In this case, it is possible to sensuously perceive approach to the turning point intersection with greater ease.

Further, in the first embodiment above, the navigation device is adapted to successively display all transit intersections. However, only information relative to intersections which cross roads having a fixed road category may be displayed.

Furthermore, in the first embodiment above, a map and the present position are displayed on the left side of a screen in the display device 25 and a plurality of intersection information is displayed on the right side of the screen. However, the intersection information may be displayed on the left side of the screen or on a lower or upper section of the screen.

In the first embodiment above, turning point intersections are displayed in a different color to the transit intersections. However, the color of the turning point intersections may be varied in accordance with the distance to the turning point intersection.

In the first embodiment above, a route for the vehicle is displayed on the left side of the screen. However, when the vehicle approaches an intersection, the display may be switched to a deformation map which shows the details of the intersection.

Embodiment 3

In the first embodiment above, when the intersection name is not added to the node additional information, the display "no name" is displayed. However, the navigation device may be adapted to generate a temporary name for the intersection from information related to the intersection and display the temporary name.

That is to say, a temporary name for the intersection may be generated from road width of intersecting roads or proximate place names and the temporary name may be displayed.

For example, if a width of an intersecting road is less than 3 m, "intersection with road of less than 3 m" may be displayed. If an address of an intersection is "Sanda-shi Miwa 2-chome", "intersection near Sanda-shi Miwa 2-chome" may be displayed.

In this way, it is possible to prevent missing a small intersection the name of which is not recorded.

Further, in the first embodiment above, a name of an intersection is displayed. However, the navigation device may be adapted to display an entrance number of an expressway, a road name (street name), a road number of the intersecting road or the like.

It is noted that while traveling on an expressway, no intersections exist on the route traveled. Thus, interchanges, parking areas, service areas may be regarded as intersections and these names and the distance thereto may be displayed.

Embodiment 4

Figure 8:
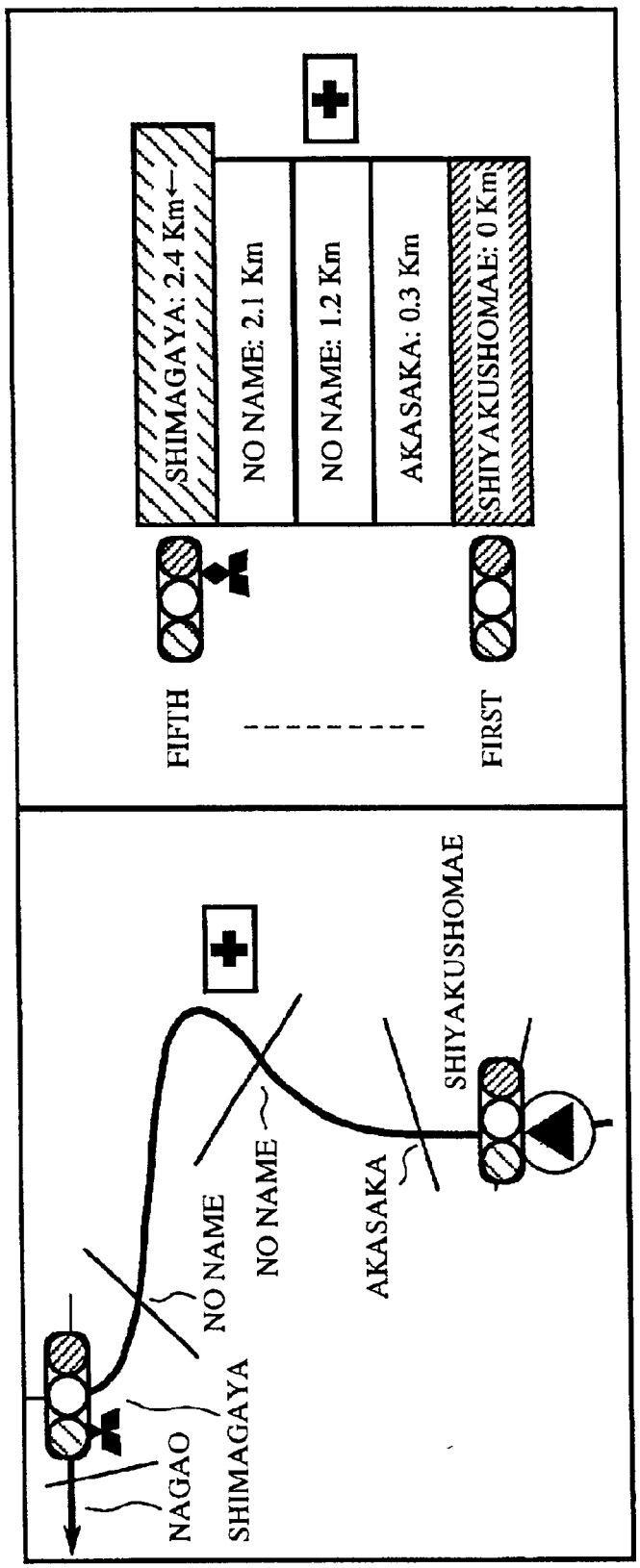
FIG. 8 describes the display contents of a screen.

In the first embodiment above, the intersection name, the distance to the intersection and the direction of travel are displayed as intersection information. However, as shown in FIG. 8, when information about a traffic signal or a landmark related to the intersection existing on the route is recorded as map information data, the traffic signal mark or the landmark (for example, hospital or gasoline station) may be displayed next to the information relating to the intersection.

In such a way, it is possible to further facilitate the discrimination of the intersection.

Embodiment 5

In the first to fourth embodiments above, the reception of VICS information is not particularly noted. However, when the navigation device is adapted to receive the VICS information transmitted from a signpost of the intersection or the like, traffic congestion information on the route may be extracted from the VICS information. If congestion positions exist, such positions are displayed as blinking displays on the map and intersections at points of the congestion are displayed with emphasis.

For example, when the traffic congestion is generated between the intersection "Shiyakushomae" and the intersection "Akasaka", the names of the intersection "Akasaka" and the intersection "Shiyakushomae" are displayed as blinking displays and a traffic congestion mark is displayed. Thus, intersections at points of the traffic congestion are clarified.

In such a way, it is possible for a user to recognize the traffic congestion on a scheduled route.

As shown above, a navigation device and a navigation method according to the present invention are adapted to indicate a route from a present position of a vehicle to a destination, and when the vehicle is guided to the destination, it is possible to take precautions to prevent divergence from the route by appropriately presenting the intersection information.

What is claimed is:

1. A navigation device comprising:

a route searching means which searches a route from a present position of a vehicle to a destination;

a route guiding means which extracts each intersection existing on the route searched by said route searching means and calculates a distance from the present position of the vehicle to each of the intersections; and a display means which displays the route searched by said route searching means and further displays the distance to each intersection and a name of each intersection extracted by said route guiding means.

2. The navigation device according to claim 1, wherein said route guiding means is adapted to confirm passage of the intersection by the vehicle and to give a change command with respect to the intersection to be displayed to the display means.

3. The navigation device according to claim 1, wherein said display means is adapted to display a direction of travel at an intersection when the intersection extracted by said route guiding means is a turning point intersection.

4. The navigation device according to claim 1, wherein said display means is adapted to display an intersection with emphasis when the intersection extracted by said route guiding means is a turning point intersection.

5. The navigation device according to claim 1, wherein said display means is adapted to display a fact of a non-recordal of an intersection name when the name of the intersection extracted by said route guiding means is not recorded on a map information.

6. The navigation device according to claim 1, wherein said display means is adapted to generate a temporary name of an intersection from information related to the intersection and to display the temporary name, when a name of the intersection extracted by said route guiding means is not recorded on a map information.

7. The navigation device according to claim 1, wherein said display means is adapted to display a landmark or a traffic signal mark together with the name of an intersection when information about the landmark or the traffic signal mark related to the intersection extracted by said route guiding means is recorded on a map information.

8. The navigation device according to claim 1, wherein said display means is adapted to display intersections at points of congestion with emphasis when congestion information with respect to the route searched by said route searching means is received.

9. A navigation method comprising the steps of:

searching a route from a present position of a vehicle to a destination;

extracting each intersection existing on said route;

calculating a distance from the present position to each intersection; and displaying the route, the distance to each intersection and the name of each intersection.

10. The navigation method according to claim 9, which is adapted to change an intersection to be displayed upon confirmation of the vehicle passing through the intersection.

11. The navigation method according to claim 9, which is adapted to display a direction of travel at an intersection when the intersection existing on the route is a turning point intersection.

12. The navigation method according to claim 9, which is adapted to display an intersection with emphasis when the intersection existing on the route is a turning point intersection.

13. The navigation method according to claim 9, which is adapted to display a fact of a non-recordal of an intersection name when the name of the intersection existing on the route is not recorded on a map information.

14. The navigation method according to claim 9, which is adapted to generate a temporary name of an intersection from information related to the intersection and to display the temporary name, when a name of the intersection existing on the route is not recorded on a map information.

15. The navigation method according to claim 9, which is adapted to display a landmark or a traffic signal mark together with the name of an intersection when information on the landmark or the traffic signal mark related to the intersection existing on the route is recorded on a map information.

16. The navigation method according to claim 9, which is adapted to display intersections at points of congestion with emphasis when congestion information with respect to the searched route is received.

17. A navigation device comprising:

a route searching device, which searches a route from a present position to a destination;

a route guiding device, which extracts each intersection, and identifying information for each intersection, existing on the route and calculates the distances from the present position to each intersection; and a display device, which displays the route, each intersection, identifying information for each intersection, and distances.

18. The device according to claim 17, wherein said display device displays the route and intersections as a map with the names of the intersections on the map.

19. The device according to claim 18, wherein said display device further displays landmarks on the map and identifies the landmarks by predetermined symbols or names.

20. The device according to claim 19, wherein said display device further displays traffic control identifiers on the map and identifies the identifiers by predetermined symbols or names.

* * * * *